Feb. 8, 1949.    G. E. NIGHTHART    2,460,945
BICYCLE SERVICING FIXTURE
Filed March 7, 1947    2 Sheets-Sheet 1
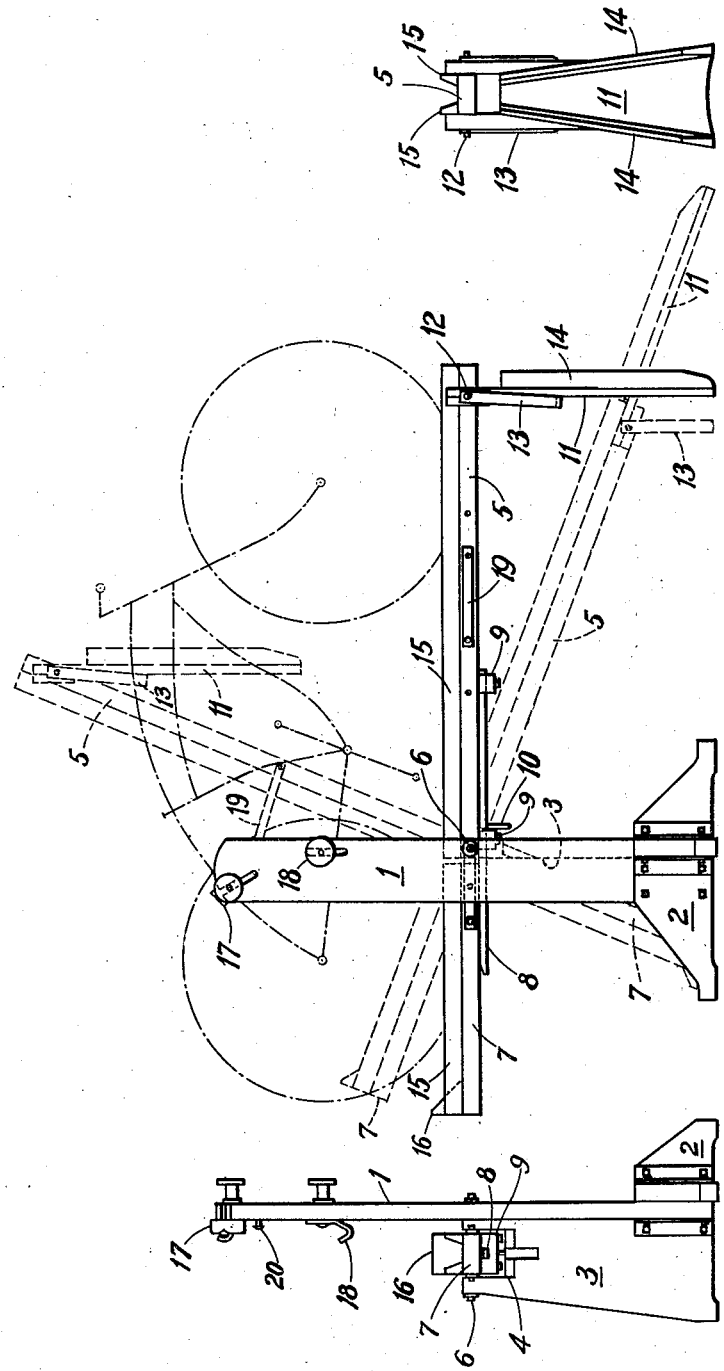
INVENTOR
George E. Nighthart
BY
Robert T. Tester
ATTORNEY Feb. 8, 1949.    G. E. NIGHTHART    2,460,945
BICYCLE SERVICING FIXTURE
Filed March 7, 1947    2 Sheets-Sheet 2

INVENTOR
George E. Nighthart
BY
Robert T. Teeter
ATTORNEY

Patented Feb. 8, 1949

2,460,945

UNITED STATES PATENT OFFICE 2,460,945

BICYCLE SERVICING FIXTURE

George E. Nighthart, Lewistown, Pa.

Application March 7, 1947, Serial No. 733,059

4 Claims. (Cl. 211—17)

This invention relates to a fixture for bicycle motor mounting, servicing or display. The purpose of this fixture is to hold a bicycle and various portions thereof, in secure manner, at convenient height, for the following purposes: mounting and servicing of a motor, repair and servicing of the rear wheel assembly and parts thereof, repair and servicing of the front wheel assembly and parts thereof, repair and servicing of the pedal crank assembly and parts thereof, and display of a bicycle, whether motorized or not, when the fixture is not in use for other purposes. Furthermore the fixture is adapted to the ready loading and unloading, and securing and releasing of bicycles when the fixture is employed for any of the above purposes.

The object of the invention is to provide a convenient bicycle servicing and display fixture that lends itself to many functions and may be stored in a small space when not in use. Other objects and advantages of the invention will become apparent upon a reading of the following detailed description of a preferred embodiment of the invention, with reference to the drawings.

In the drawings:

Fig. 1 is a front view of the preferred form of bicycle servicing fixture of the invention, showing the parts in the position occupied when the fixture is in normal use. Alternative positions of the parts are shown in dotted lines;

Fig. 2 is a left end view of the fixture;

Fig. 3 is a right end view of the runway and ramp section only of the fixture;

Figure 4:
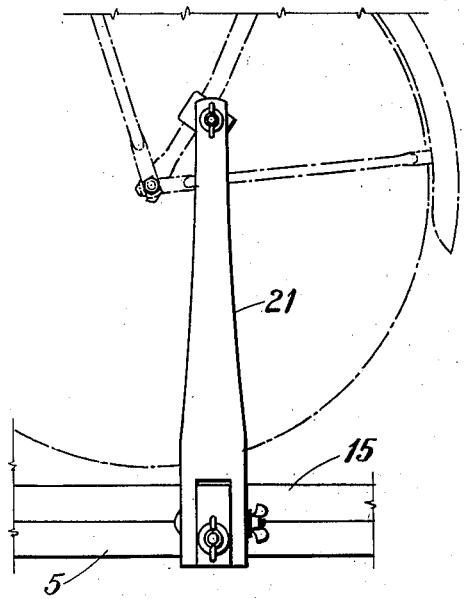
Fig. 4 is a rear view of a steering fork clamping arm supported by the intermediate runway section of the fixture shown in the preceding figures.

With reference now to Figs. 1, 2 and 3, the preferred form of bicycle servicing fixture will be described. It will be seen that an upright member 1 is supported and stabilized by a cruciform base 2. Forming a part of the upright member 1 and its cruciform base 2 is a pedestal 3 having a cut out portion of the top thereof forming yoke 4.

One end of the intermediate section 5 of an articulated bicycle runway is pivotally connected by means of pin 6 to the pedestal 3 and upright member 1 at the yoke 4. A drop-leaf section 7 of the runway extends from the pivotally supported end of the intermediate section 5, and is likewise pivotally supported commonly therewith by means of pin 6 through the upright member 1 and the yoke 4 of the pedestal 3.

The drop-leaf section 7 is ordinarily retained in line with the intermediate section 5 by a latch bar 8 slidingly supported in two spaced clips 9 attached to the underside of the intermediate runway section 5. By pulling the handle 10 of latch bar 8 over against the clip 9 opposite to that against which it is shown in Fig. 1, the drop-leaf section is disengaged by latch bar 8 and permitted to pivot downwardly to an out-of-the-way position shown in dotted lines in Fig. 1. As indicated there is articulation between the sections 5 and 7 of the runway at the pin 6.

The outboard end of the intermediate section 5, opposite that supported through pin 6, may be conveniently supported, to hold the intermediate section 5 horizontal, by a ramp section 11. This ramp section 11 may not only function to support the end of the intermediate section 5, when pivotally lowered as shown, but also may be pivotally extended as an entering runway section as shown in dotted lines in Fig. 1. It is pivotally connected, through a pin 12, to the outboard end of the intermediate section 5. Also pivotally connected, through pin 12, to the outboard end of the intermediate section 5, is a short supporting leg 13. This leg 13 pivots to support the outboard end of the intermediate section 5 when it is pivotally inclined to form, with the extended ramp section 11, an inclined runway for loading and unloading a bicycle.

It is to be noted that the ramp section 11 is provided with converging guide rails 14 that form an entering channel adapted to receive a bicycle wheel and tire. The intermediate and drop-leaf sections 5 and 7 have parallel guide rails 15 that form a similar narrow channel. At the far end of the drop-leaf section 7 is a bumper block 16 set in the channel formed by the guide rails 15.

Above the runway, the upright member 1 is provided with means for securing and supporting the rear end of a bicycle frame. An upper fork clamp 17 is adapted to be brought into position and tightened to secure the upper rear fork of a bicycle. A lower fork support 18 is adapted to be brought into position and tightened to support the lower rear fork of a bicycle. Both are mounted in slots in the upright member 1 so as to permit adjustment thereof to various types of bicycle frames.

Since it is sometimes desirable to store the fixture in a small space a tie bar 19 is provided on the intermediate section 5 and a peg 20 is provided on the upright member 1. By means of the tie bar 19 and the peg 20 the intermediate section 5 may be secured in an upwardly inclined position as shown in dotted lines in Fig. 1, so that the fixture may be stored in a minimum of space.

Figure 5:
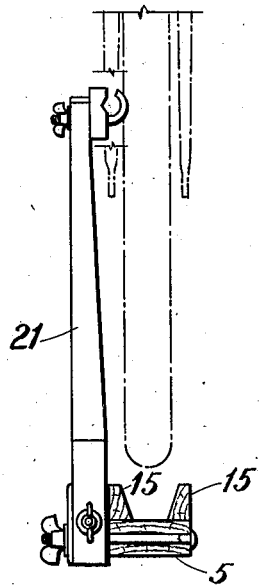
Fig. 5 is an end view of the steering fork clamping arm shown in Fig. 4.

Reference will now be made to Figs. 4 and 5. In these figures a steering fork clamping arm 21 is illustrated. It will be seen that the clamping arm is mounted, for adjustment in two planes of rotation, on the intermediate section 5. It has an adjustable clamp at its extremity adapted to receive and secure one arm of a bicycle steering fork.

Figure 6:
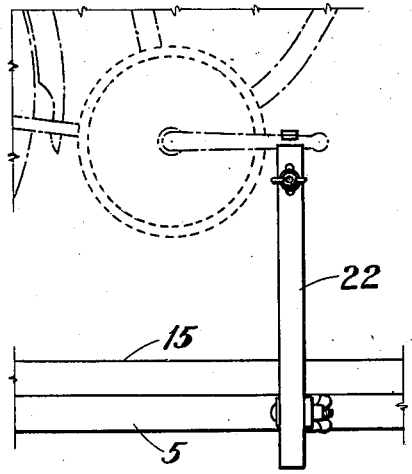
Fig. 6 is a front view of a pedal crank clamping arm supported by the intermediate runway section of the fixture shown in Figs. 1, 2, and 3.
Figure 7:
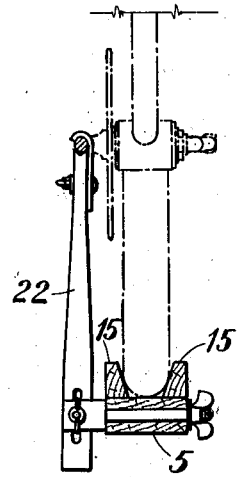
Fig. 7 is an end view of the pedal crank clamping arm shown in Fig. 6.

In Figs. 6 and 7 a pedal crank clamping arm is illustrated. It will be seen that the pedal crank clamping arm is mounted, for adjustment in two planes of rotation, on the intermediate section 5. It is provided with an adjustable clamp at its extremity adapted to receive and secure a pedal crank arm.

Both the steering fork clamping arm and the pedal crank clamping arm are readily attached and removed, or disposed in non-interfering positions when not in use.

The bicycle servicing fixture of the invention is readily and conveniently employed in the following way. The runway, including sections 7, 5 and 11, is placed in inclined position for loading of a bicycle into the fixture. This position of the runway sections is shown in dotted lines in Fig. 1. A bicycle is rolled backwards up the runway until the rear wheel reaches the bumper block 16. Then the rear end of the bicycle is pressed down and the front end lifted, causing the front end of the bicycle and the intermediate section 5 of the runway to be raised. The intermediate section 5 and the drop-leaf section 11 will be brought to a horizontal position, while the ramp section 11 automatically swings downward to vertical position, where it becomes an outboard support for the intermediate section 5.

The bicycle should then be moved forward slightly, where the upper fork clamp and lower fork support can be brought into securing and supporting positions and then tightened in such positions so as to hold the rear end of the bicycle frame. The latch handle 10 may then be moved over against the right hand latch bar clip 9, moving latch bar 8 out from under the rear runway section 7. This will permit the drop-leaf section 7 to pivot downwardly away from the rear wheel of the bicycle. This will permit removal and replacement of wheel and released parts. When desired the drop-leaf section 11 may be again raised and latched in horizontal position.

In the meantime the pedal crank clamping arm may be employed to secure the pedal crank for work at that location. Also the steering fork clamping arm may be employed to lock the steering fork of the bicycle in a raised position, to permit removal and replacement of front wheel and related parts.

After the work on the bicycle has been finished, all the clamps may be released, to permit the bicycle to be removed. The bicycle is then moved over against the bumper block 16, the front end lifted and the rear end pressed down while the ramp section 11 is kicked out from under the outboard end of the intermediate section 5. This will permit the three sections of the articulated runway to assume the inclined loading and unloading position, the outboard end of the intermediate runway section 5 being supported in the inclined position by the short supporting leg 13, which swings into proper supporting position automatically. Then the bicycle can be allowed to roll down to the floor. When it is desired to store the fixture the intermediate section 5 is lifted upwardly to an off vertical position shown in dotted lines Figure 1. There it is secured by the tie bar 19 connecting to the peg 20.

Numerous modifications of the invention may be made. I claim as my invention the following:

1. As a bicycle servicing fixture the combination comprising an upright member, means on said upright member for securing and supporting one end of a bicycle frame in elevated position, and an articulated bicycle runway comprising sections, one end of an intermediate section of said runway being pivotally supported by said upright member below said securing and supporting means, one end of a ramp section of said runway being pivotally connected to the outboard end of said intermediate section, and one end of a drop-leaf section of said runway being pivotally connected to the end of said intermediate section supported by said upright member, said intermediate section being adapted to be pivotally inclined for loading or unloading a bicycle and raised to horizontal position to support at least one end of the bicycle, said ramp section being adapted to be pivotally extended as an entering runway section and lowered as a supporting leg for the outboard end of said intermediate section, and said drop-leaf section being adapted to be pivotally extended as a rear runway section and lowered to an out-of-the-way position, and means to hold said drop-leaf section in the same plane as said intermediate section.

2. The combination according to claim 1 and having a short supporting leg pivotally connected to the outboard end of said intermediate runway section for supporting the same when pivotally inclined for loading or unloading a bicycle.

3. The combination according to claim 1 and having a clamping arm supported by said intermediate section for supporting and stabilizing a steering fork of a bicycle to permit removal and replacement of a front wheel.

4. The combination according to claim 1 and having a clamping arm supported by said intermediate section for securing a pedal crank of a bicycle.

GEORGE E. NIGHTHART.

REFERENCES CITED

The following references are of record in the file of this patent:

UNITED STATES PATENTS

| Number | Name | Date |
|---|---|---|
| 1,322,595 | Meiklejohn | Nov. 25, 1919 |
| 1,445,394 | Harvey | Feb. 13, 1923 |
| 1,597,592 | Galloway | Aug. 24, 1926 |

FOREIGN PATENTS

| Number | Country | Date |
|---|---|---|
| 330,518 | Germany | Dec. 16, 1920 |